United States Patent [19]

Henderson

[11] Patent Number: 4,952,197
[45] Date of Patent: * Aug. 28, 1990

[54] BELT TENSIONER AND METHOD OF MAKING THE SAME

[75] Inventor: Dewey D. Henderson, Springfield, Mo.

[73] Assignee: Dayco Products, Inc., Dayton, Ohio

[*] Notice: The portion of the term of this patent subsequent to Dec. 12, 2006 has been disclaimed.

[21] Appl. No.: 450,352

[22] Filed: Dec. 13, 1989

Related U.S. Application Data

[62] Division of Ser. No. 395,112, Aug. 17, 1989, which is a division of Ser. No. 276,084, Nov. 23, 1988, Pat. No. 4,886,483.

[51] Int. Cl.⁵ ............................................. F16H 7/12
[52] U.S. Cl. .................................................. 474/135
[58] Field of Search ............... 474/101, 109, 110, 111, 474/133, 135, 113–117, 136, 138

[56] References Cited

U.S. PATENT DOCUMENTS

| | | | |
|---|---|---|---|
| 4,596,538 | 6/1986 | Henderson | 474/135 |
| 4,728,318 | 3/1988 | Henderson | 474/135 |
| 4,784,631 | 11/1988 | Henderson | 474/135 |

*Primary Examiner*—Thuy M. Bui
*Attorney, Agent, or Firm*—Joseph V. Tassone

[57] ABSTRACT

A tensioner for a power transmission belt that is adapted to be operated in an endless path and a method of making the same are provided, the tensioner having a frictional dampening unit operatively associated with the support unit and the belt engaging unit thereof to dampen the movement of the belt engaging unit relative to the support unit, the dampening unit comprising a pair of frictionally engaging first and second parts with the first part comprising an annular pad of friction material that is coaxially disposed and axially movable on a shaft relative to the second part, and a spring urging the first part against the second part with a certain spring force, the first part of the dampening unit having a guide thereon, the one of the support unit and the belt engaging unit having an opening therein that receives the guide therein from one side thereof to guide axial movement of the first part, a bearing unit disposed in the opening and receiving the guide therein, and a bearing member having the bearing unit on one side thereof and being disposed in the opening from the other side of the one of the support unit and the belt engaging unit.

6 Claims, 4 Drawing Sheets

BELT TENSIONER AND METHOD OF MAKING THE SAME

CROSS REFERENCE TO RELATED APPLICATIONS:

This application is a divisional patent application of its copending parent patent application, Ser. No. 395,112, filed Aug. 17, 1989, which, in turn, is a divisional patent application of its copending parent patent application, Ser. No. 276,084, filed Nov. 23, 1988 now U.S. Pat. No. 4,886,483.

BACKGROUND OF THE INVENTION

1. Field of the Invention

This invention relates to a new tensioner for an endless power transmission belt or the like and to a new method of making such a tensioner.

2. Prior Art Statement

It is known to provide a tensioner for a power transmission belt that is adapted to be operated in an endless path, the belt tensioner comprising a support means for being fixed relative to the belt, a belt engaging means carried by the support means and being movable relative thereto, a first spring means operatively associated with the support means and the belt engaging means for urging the belt engaging means relative to the support means and against the belt with a force to tension the belt, and frictional dampening means operatively associated with the support means and the belt engaging means to dampen the movement of the belt engaging means relative to the support means in at least one direction of movement thereof, the dampening means having a longitudinal axis, the support means comprising a shaft means having a longitudinal axis and being fixed from movement relative to the belt engaging means, the belt engaging means having a portion thereof being rotatably carried by the shaft means so as to rotate relative to the shaft means, the dampening means comprising a pair of frictionally engaging first and second parts with the first part comprising an annular pad of friction material that is coaxially disposed and axially movable on the shaft means relative to the second part, and second spring means urging the first part against the second part with a certain spring force, the tensioner having an antifriction annular disc-like member disposed on the shaft means and the belt engaging means, the first part of the dampening means having guide means thereon, the one of the support means and the belt engaging means having opening means therein that receive the guide means therein to guide axial movement of the first part, the tensioner having bearing means disposed in the opening means and receiving the guide means therein. For example see the U.S. Pat. No. 4,596,538 to Henderson.

SUMMARY OF THE INVENTION

It is one feature of this invention to provide a new belt tensioner having a reduced number of parts with the remaining parts performing all of the functions of the prior known tensioner.

In particular, it was found according to the teachings of this invention that an antifriction disc-like member of the prior known tensioner that is disposed between a movable part of the tensioner and the coiled torsion spring thereof can have bearing means thereon that permit axial movement of one of the parts of the friction dampening means of the tensioner and thereby not only eliminate a separate bearing plate part of the prior known tensioner, but also permit the tensioner of this invention to be narrower than the prior known tensioner.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, first spring means operatively associated with the support means and the belt engaging means for urging the belt engaging means relative to the support means and against the belt with a force to tension the belt, and frictional dampening means operatively associated with the support means and the belt engaging means to dampen the movement of the belt engaging means relative to the support means in at least one direction of movement thereof, the dampening means having a longitudinal axis, the support means comprising a shaft means having a longitudinal axis and being fixed from movement relative to the belt engaging means, the belt engaging means having a portion thereof being rotatably carried by the shaft means so as to rotate relative to the shaft means, the dampening means comprising a pair of frictionally engaging first and second parts with the first part comprising an annular pad of friction material that is coaxially disposed and axially movable on the shaft means relative to the second part, and second spring means urging the first part against the second part with a certain spring force, the tensioner having an antifriction annular disc-like member disposed on the shaft means between the first spring means and one of the support means and the belt engaging means, the first part of the dampening means having guide means thereon, the one of the support means and the belt engaging means having opening means therein that receive the guide means therein to guide axial movement of the first part, the tensioner having bearing means disposed in the opening means and receiving the guide means therein, the antifriction disc-like member carrying the bearing means on one side thereof.

Accordingly, it is an object of this invention to provide a new tensioner for a power transmission belt or the like that is adapted to be operated in an endless path, the tensioner of this invention having one or more of the novel features of this invention as set forth above or hereinafter shown or described.

Another object of this invention is to provide a new method of making such a tensioner, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Therefore, this invention is not to be limited to only the embodiments illustrated in the drawings, because the drawings are merely utilized to illustrate one of the wide variety of uses of this invention.

Figure 1:
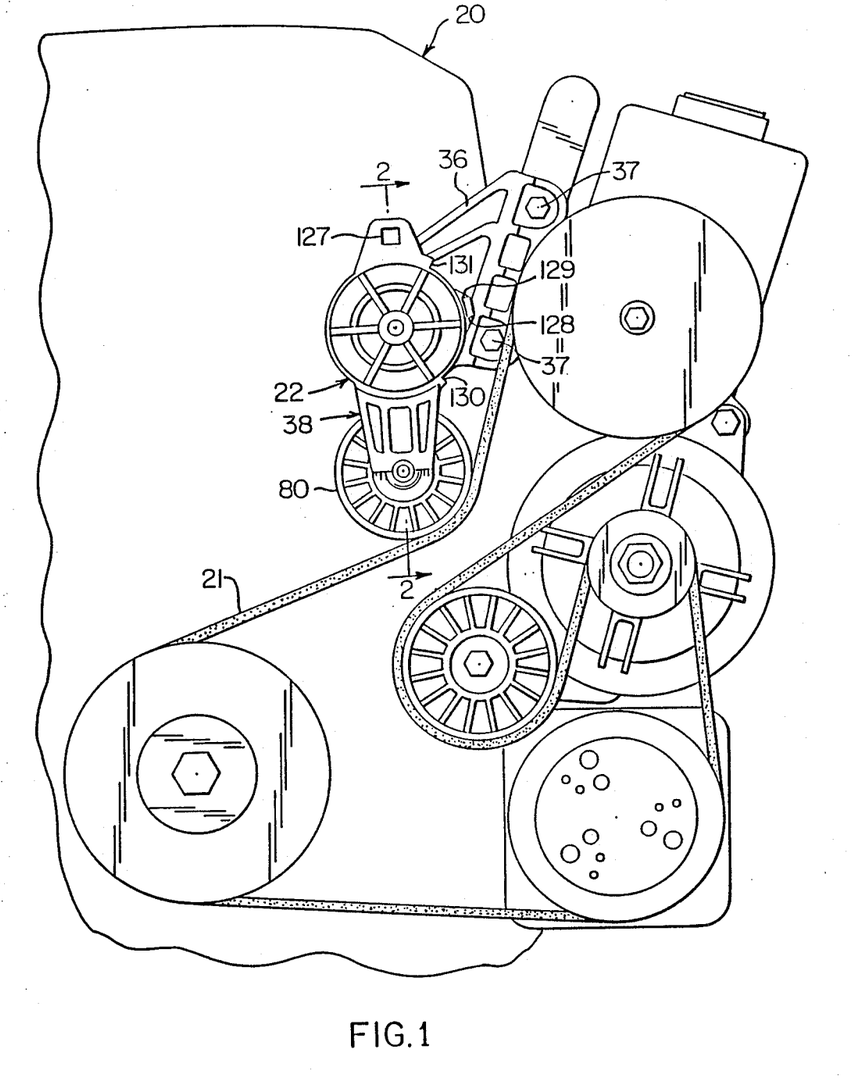
FIG. 1 is a view looking toward the front end of an automobile engine which utilizes the belt tensioner of this invention.

Referring now to FIG. 1, an automobile engine is generally indicated by the reference numeral 20 and utilizes an endless power transmission belt 21 for driving a plurality of driven accessories as is well known in the art, the new belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because the unique features of the tensioner 22 of this invention readily permit the tensioner 22 to tension a belt having a load-carrying cord in an efficient manner as fully set forth in the aforementioned U.S. Pat. No. 4,596,538 to Henderson.

Also, because many of the parts of the belt tensioner 22 of this invention and the details of the operation thereof are fully described and illustrated in the aforementioned U.S. patent to Henderson, this patent is being incorporated into this disclosure by this reference thereto whereby a further discussion of the engine 21 and the operation of the tensioner 22 on the belt 21 is deemed unnecessary.

Thus, the belt tensioner 22 of this invention will now be described by using many of the same reference numerals as used in the U.S. Pat. No. 4,596,538, to Henderson in order to facilitate the understanding of the various features of this invention.

Figure 2:
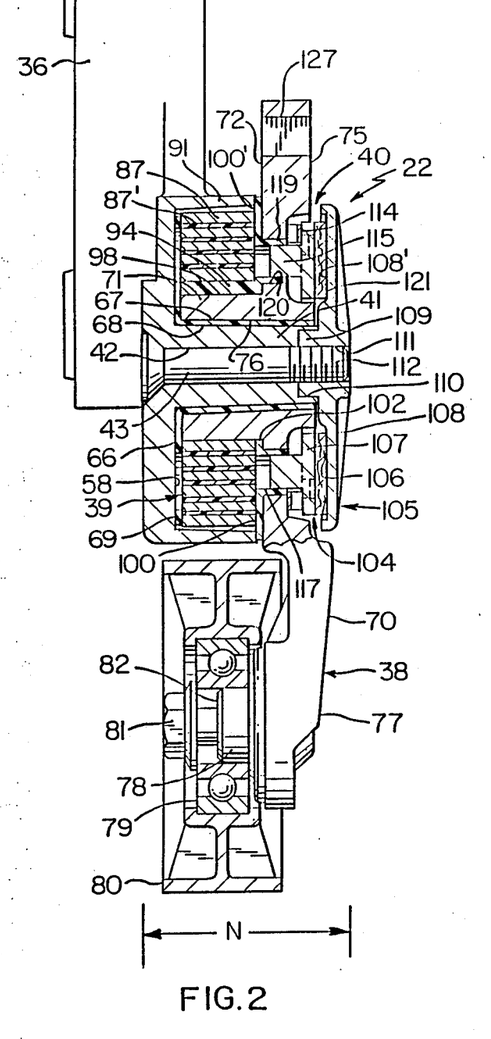
FIG. 2 is an enlarged fragmentary cross-sectional view of the belt tensioner of FIG. 1 and is taken on line 2—2 of FIG. 1.

As best illustrated in FIGS. 2-5, the new belt tensioner 22 of this invention comprises a metallic support means 36 adapted to be fixed to a mounting bracket or structure of the engine 20 by fastening means 37 as illustrated in FIGS. 1 and 2. A belt engaging means that is generally indicated by the reference numeral 38 is movably carried by the support means 36 in a manner hereinafter set forth. The tensioner 22 has mechanical spring means that is generally indicated by the reference numeral 39 operatively associated with the support means 36 and the belt engaging means 38 to tend to urge the belt engaging means 38 against the belt 21.

Figure 3:
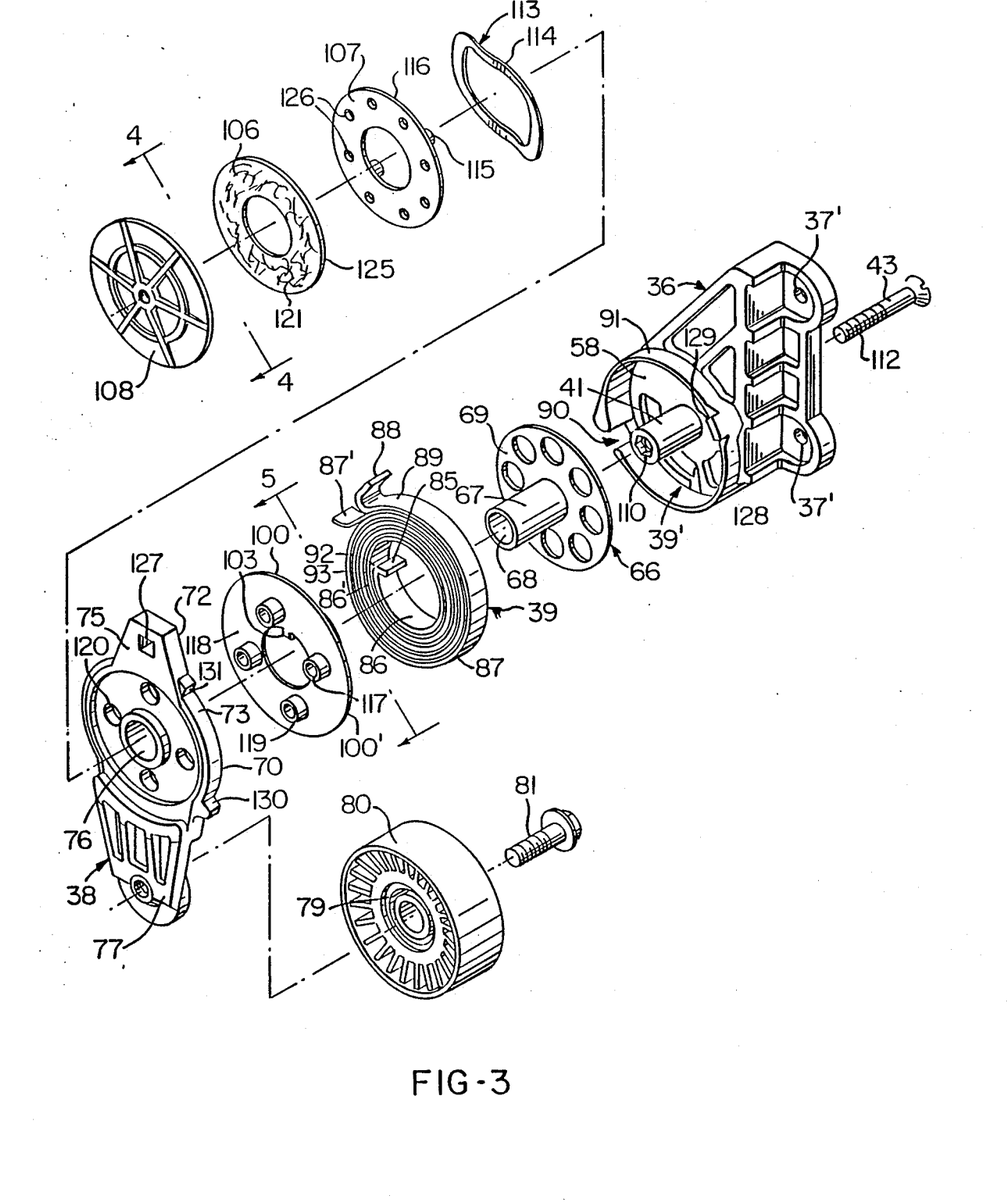
FIG. 3 is an exploded perspective view illustrating the various parts of the belt tensioner of FIGS. 1 and 2.

The belt tensioner 22 also includes a friction dampening means that is generally indicated by the reference numeral 40 and is operatively associated with the support means 36 and the belt engaging means 38 to dampen movement of the belt engaging means 38 relative to the support means 36 in a manner hereinafter set forth.

The friction dampening means 40 and spring means 39 are coaxially aligned and the support means 36 includes an integral tubular member or shaft means 41 that has a cylindrical opening 42 passing completely therethrough to receive a fastening member 43 that is adapted to fasten an end plate 108 to the support means 36 of the tensioner 22 in a manner hereinafter set forth The support means 36 has mounting openings 37' disposed parallel to the shaft means 41 in offset relation thereto for receiving the fastening members 37 therein for securing the tensioner 22 to the engine 20 whereby the support means 36 will be stationary.

A bearing member 66 comprising a cylindrical tubular portion 67 having a cylindrical opening 68 passing therethrough is telescopically disposed on the tubular member or shaft means 41 of the support means 36 and has a disc end member 69 adapted to be disposed against a flat end wall 58 of the support means 36 as illustrated, the bearing member 66 being formed of any suitable material, such as an anti-friction plastic material, in order to provide for relative movement of the belt engaging means 38 relative to the fixed shaft means 41 as fully set forth in the U.S. Pat. No. 4,536,172, to Brew et al, whereby this patent is being incorporated into this disclosure by this reference thereto. In addition, see the U.S. Pat. No. 4,624,652, to Foster, which patent is being incorporated into this disclosure by this reference thereto. Since other bearing means for permitting the belt engaging means to readily move relative to a fixed shaft means is fully disclosed in the abandoned patent application of Ser. No. 427,074 of Randy C. Foster filed Sept. 29, 1982, this patent application is also being incorporated into this disclosure by this reference thereto.

The belt engaging means 38 comprises a metallic pivot arm 70 having a tubular projection 71 extending from one side 72 of an end portion 73 thereof that has an opposed flat side 75, the tubular portion 71 and end portion 73 having a cylindrical bore 76 passing completely therethrough so as to be adapted to be telescopically disposed on the fixed shaft means 41 with the bearing sleeve 67 disposed therebetween so that the end portion 73 of the arm 70 can rotate or oscillate relative to the fixed shaft means 41 for a purpose hereinafter set forth.

The other end 77 of the pivot arm 70 has a pivot extension 78 adapted to pass into a bearing 79 of a belt pulley or wheel 80 which is fastened thereon by a suitable fastening means 81 being received in a threaded internal bore (not shown) in the end 82 of the projection 78 whereby the wheel 80 is adapted to rotate on the pivot shaft 78 and engage against the belt 21 in a manner well known in the art.

The tubular portion 71 of the pivot arm 70 has a transverse slot (not shown) formed therein and is adapted to receive an inwardly bent end 85 of an inner coil 86 of a spirally wound flat metallic spring member 87 that comprises the mechanical spring means 39 of the tensioner 22.

The spring member 87 has an outer end 88 bent at an angle relative to an outer coil 89 of the spring 39 and is adapted to be received in a slot 90 formed in an annular side wall 91 of the support means 36 so as to fasten the outer end 88 of the spring 87 to the support means 36, the inner end 85 of the spring member 87 being interconnected to the arm 70 or belt engaging means 38 to tend to urge the pulley 80 toward the belt 21 with a tensioning force of the spring member 87 in the manner set forth in the forementioned U.S. patents.

It was found according to the teachings of the invention set forth in the aforementioned U.S. Pat. No. 4,596,538, to Henderson, that the inner end 85 of the torsion spring member 87 at its joint area 92 with the inner coil 86 tends to weaken the inner coil 86 in the area of the reference numeral 93 as it begins to form the next inner coil 86' because the area 93 is held away from the tubular member 71 in a bridging manner as the same wraps around the inner coil 86 adjacent that joint area 92.

However, one feature of that invention is to provide a protective member between the inner coil 86 and tubular portion 71 of the belt engaging means 38 adjacent the bent inner end 85 of the spring member 87 to tend to minimize such bridging problem.

Figure 5:
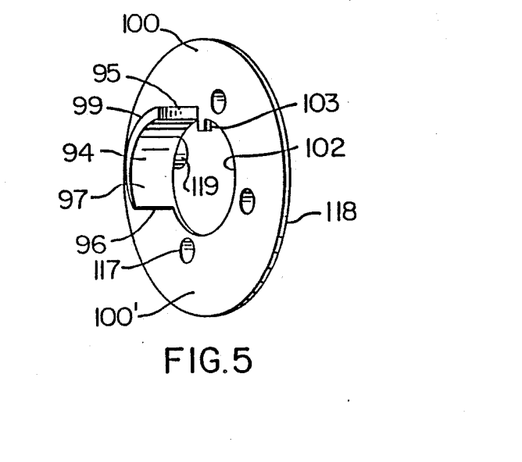
FIG. 5 is a rear perspective view of the disc-like member of FIG. 3 and is taken in the direction of the arrows 5—5 of FIG. 1.

In particular, a protective arcuate member 94, FIG. 5, formed of any suitable polymeric material has a thickened end 95 that tapers to a thinner end 96 and is adapted to have its inner side 97 substantially conform to the outer peripheral surface 98 of the tubular portion 71 as illustrated in FIG. 2 with its end 95 being disposed adjacent the bent end 85 of the coil 87 so that the portion 92 of the inner coil 86 will engage against its outer tapering surface 99 from the end 96 thereof to the end 95 thereof so that no substantial gap exists between the inner coil 86 and the protective member 94 when the inner coil 86 is being wrapped upon itself during winding up of the spring means 87.

The protective member 94 has an integral disc-like member 100 provided with an opening 102 therethrough which is adapted to be telescopically disposed on the tubular portion 71 of the belt engaging arm 70, the disc-like member 100 having an inwardly directed tang 103 for being received in the slot (not shown) of the tubular portion 71 to rotationally orient the protective member 94 for assembly to prevent rotational movement thereof relative to the tubular member 71 so that the protective member 94 is held in a positive position relative to the bent end 85 of the spring 87 as illustrated for the reasons previously set forth.

Thus, the protective member, in effect, extends from one side 100' of the disc-like member and is integral therewith.

When the spring means 39 and belt engaging arm 70 are assembled on the bearing sleeve 66 and, thus, on the fixed shaft means 41, it can be seen that the disc end 100 of the protective member 94 and the disc end 69 of the bearing sleeve 66 provide antifriction material on adjacent sides of the coiled spring member 87 to tend to reduce friction therewith during the winding and unwinding of the spring strip 87 as set forth in the aforementioned U.S. Pat. No. 4,536,172.

Also, a strip 87' of the antifriction material can be disposed between the adjacent coils of the spring 87 in a manner well known in the art, as desired.

Thus, the annular wall 91 and end surface 58 of the support means 36 provide a cavity 39' in the support means 36 that receives the coiled torsion spring 39 therein when the spring 39 is disposed on the shaft means 41, the cavity 39' being closed by the disc-like member 100.

The friction dampening means 40 of the tensioner 22 of this invention comprises one part that is generally indicated by the reference numeral 104 in FIG. 2 that is coaxially disposed on the shaft means 41 and is axially movable thereon in a manner hereinafter set forth to cooperate with another part of the dampening means 40 that is generally indicated by the reference numeral 105 and comprises the end plate 108, the one part 104 comprising an annular pad 106 of any suitable friction material, such as an injection molded polyurethane or other high coefficient of friction thermoplastic material, and a rigid metallic force plate 107 that is secured to the annular pad 106 of friction material and backs up the annular pad 106 of friction material.

Figure 4:
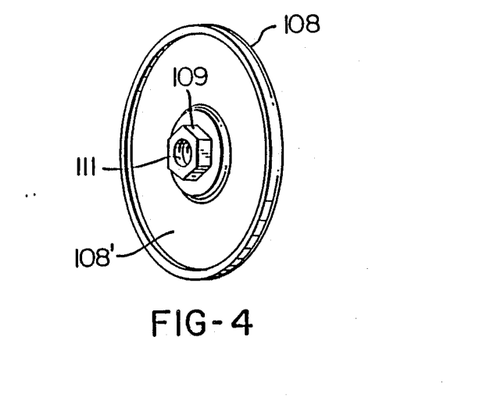
FIG. 4 is a rear perspective view of the end plate of FIG. 3 and is taken in the direction of the arrows 4—4 of FIG. 3.

In addition, the friction dampening means 40 includes a flat annular surface 108' on the metallic cover member or end plate 108 that will be engaged by the annular pad 106 of friction material, the end plate 108 having an opening 111 formed centrally therethrough and being threaded onto the threaded end portion 112 of the fastening member 43. The cover member or end plate 108 has a multi-sided central projection 109, such as a hex-shape, received in a multi-sided opening 110 in the free end of the shaft means 41 to spline the end plate 108 and shaft means 41 together whereby the end plate 108 comprises part of the support means 36 as the same is fixed to the fixed shaft means 41 of the support means 36. The cover member or end plate 108, after being splined onto the end of the shaft means 41 so as to be non-rotatable relative thereto, is held in its final assembly on the fixed shaft means 41 by the fastening member 43 which also provides reinforcement to the shaft means 41.

A spring means, independent of the torsion spring 39 of the tensioner 22, is disposed between the portion 73 of the belt engaging means 38 and the part 104 of the friction dampener 40 to urge the part 104 axially on the shaft means 41 and against the other part 105 with a certain spring force to provide for the friction dampening of the movement of the arm 70 relative to the shaft means 41 and, thus, relative to the support means 36 for the same reasons that the aforementioned U.S. patents utilize a rotary fluid dampening means for dampening such movement of the arm 70, such other spring means being generally indicated by the reference numeral 113 and in the embodiment illustrated in the drawings comprising an annular wavy metallic spring member 114 with it being understood that the spring means 113 could comprise a plurality of wavy spring members 114 or other spring means as desired.

It was found according to the teachings of the invention of U.S. Pat. No. 4,596,538 that during operation of the belt tensioner 22, there is normal wear on the pivot bushing 67 during rotation of the belt engaging arm 70 thereon so that the end portion 73 of the arm 70 tends to cock on the shaft means 41 through the worn out bearing sleeve 67 so that in order to assure that the annular pad 106 of the part 104 makes full annular contact with the surface 108' of the end plate 108, the part 104 of the friction dampening means 40 is provided with spline or guide means 115 that project from the side 116 of the backup plate 107 of the part 104 to be loosely received in suitable spline openings or means 117 formed through a plurality of tubular portions or bearing means 119 carried on the side 118 of the disc-like member 100 and press-fittingly received in suitable openings 120 formed in the arm 70 so as to hold the disc-like member 100 from rotation relative thereto. However, because of the loose connection of the projections or guides 115 in the openings 117 as well as through the normal resiliency of the polymeric material forming the tubular parts or bearing means 119, the part 104 of the friction dampening means 40 is adapted to cock relative to the shaft means 41 and thereby apply the full side 121 of the annular friction pad 106 against the surface 108' of the end plate 108 through the self-aligning relation of the spline means 115 and 117 and the action of the spring means 113 tending to axially move the part 104 relative to the part 105 as previously set forth.

While the friction pad 106 can be carried by the backup plate 107 in any suitable manner, the annular pad 106 has projections (not shown) extending from the side 125 thereof to be respectively received in openings 126 formed through the backup plate 107 so as to interconnect the pad 106 thereto through the spline connection means 126.

In this manner, it can be seen that the annular pad 106 will rotate in unison with the arm 70 as the arm 70 rotates on the shaft means 41 because the annular pad or member 106 is splined to the backup plate 107 through the spline means 126 and the backup plate 107 is, in turn, splined to the disc-like member 100 through the spline means 115, 117 with the disc-like member 100 being splined to the arm 70 through the spline means 119, 120.

Thus, it can be seen that the disc-like member 100 of this invention has the protective member 94 formed on one side 100' thereof and the bearing means 119 formed on the other side 118 thereof so that a separate bearing plate as used in the tensioner of the U.S. Pat. No. 4,596,538 is eliminated and by eliminating that bearing plate that would carry the bearing means 119, the tensioner 22 of this invention is narrower in the direction N as illustrated in FIG. 2.

From the above, it can be seen that the various parts of the tensioner 22 of this invention can be readily assembled onto the shaft means 41 of the support means 36 and be held together in the assembled relation thereon by the cover member 108 being threaded onto the threaded end portion 112 of the fastening means 43 as illustrated in FIG. 2.

The operation of the belt tensioner 22 of this invention will now be described.

When the tensioner 22 of this invention has been mounted to the engine 20, the torsion spring 87 is so wound up that it is tending to urge the pulley 80 in a counterclockwise direction against the belt 21 as illustrated in FIG. 1. The adjustment of the pulley 80 onto the belt 21 is facilitated by a suitable tool being inserted into a rectangular opening 127 formed in the arm 70 so that the arm 70 can be rotated to place the pulley 80 onto the belt 21 in opposition to the force of the torsion spring 87.

Accordingly, in all operating positions of the arm 70 of the belt engaging means 38, the torsion spring 87 has a force tending to move the belt engaging means 38 in a direction so as to always provide a tensioning force on the belt 21.

The movement of the belt engaging arm 70 relative to the support means 36 is limited by stop edges 128 and 129 formed on the annular part 91 of the support means 36 and against which cooperating shoulders 130 and 131 on the arm 70 will engage to thereby limit the rotational movement of the arm 70 in both directions on the shaft means 41.

Accordingly, assuming that the belt engaging means 38 is in the full line position illustrated in FIG. 1 against the belt 21 and a normal oscillation of the belt 21 during the operation of the engine 20 for the reasons previously set forth causes the belt engaging means 38 to move further inwardly toward the belt 21 in a counterclockwise direction in FIG. 1, such counterclockwise movement of the arm 70 causes the end portion 73 to rotate in a counterclockwise direction relative to the stationary surface 108' of the end plate 108 so that the rotating friction material 106, through the axial urging of the spring means 113, tends to retard such rotary movement of the belt engaging arm 70 so as to dampen the movement of the belt engaging means 38 toward the belt 21. Conversely, should the fluctuation of the belt 21 cause the belt engaging means 38 to move in a clockwise direction away from the belt 21 as illustrated in FIG. 1, such movement of the arm 70 causes the friction pad 106 that is splined in effect to the end portion 73 thereof to rotate relative to the stationary surface 108' of the end plate 108 so that the friction pad 106 tends to retard such movement of the arm 70 so as to dampen such oscillation of the belt 21 for the reasons previously set forth.

Therefore, it can be seen that the tensioner 22 provides for friction dampening of the movement of the belt engaging means 38 relative to the support means 36 so as to prevent early wearout of the bearing sleeve 66 and the mechanical spring means 39 that is operatively interconnected to the support means 36 and the belt engaging means 38 in the manner previously set forth.

Also, it can be seen that since the friction dampening means 40 and mechanical spring means 39 of the tensioner 22 of this invention are coaxially aligned on the fixed shaft means 41, such arrangement renders the tensioner 22 substantially small and compact.

It is to be understood that the dampening characteristics of the friction dampening means 40 of the tensioner 22 of this invention can be provided through variations in the material forming the end plate 108, surface preparation of the surface 108' of the end plate 108, the particular friction material forming the pad 106, the total contact area between the pad 106 and the surface 108' of the end plate 108 and the amount of spring force provided by the spring means 113.

While the belt tensioner 22 of this invention has been previously described as having the part 104 rotate against the surface 108' of the stationary end plate 108, it is to be understood that the part 104 could be carried in a splined manner by the support means 36 so as to be stationary therewith and engage against a suitable surface 108' on the cover member 108 that will rotate in unison with the arm 70 of the belt engaging means 38, if desired.

Figure 6:
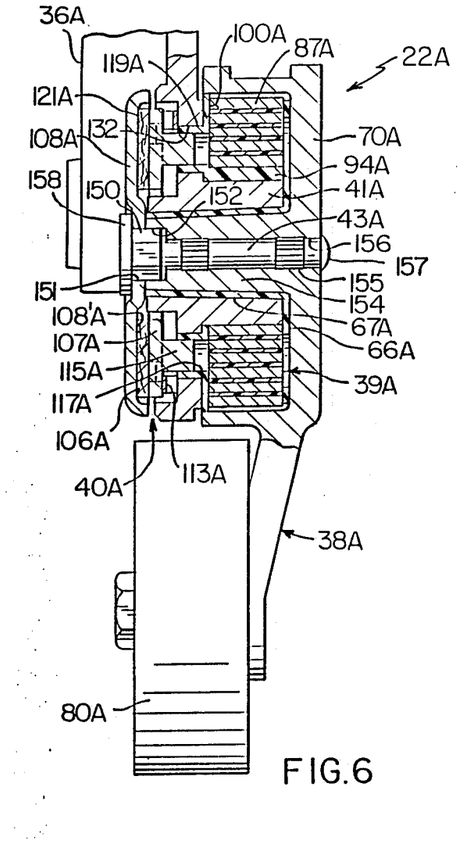
FIG. 6 is a view similar to FIG. 2 and illustrates another embodiment of the belt tensioner of this invention.
Figure 7:
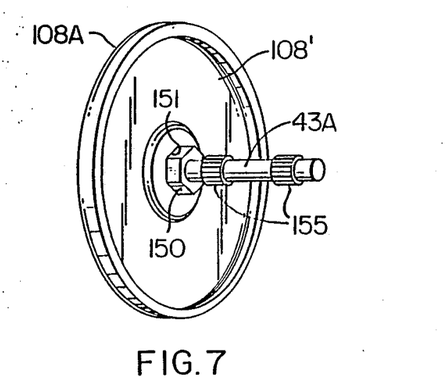
FIG. 7 is an enlarged perspective view of the end plate of the belt tensioner of FIG. 6.
Figure 8:
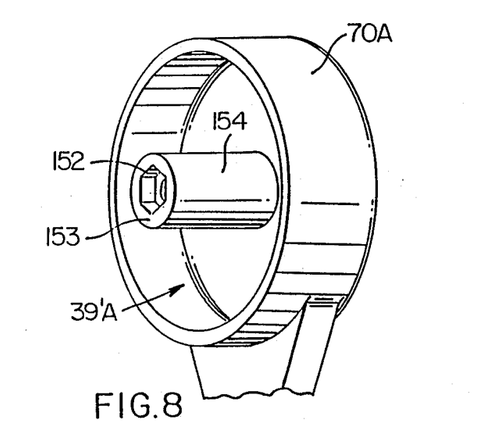
FIG. 8 is an enlarged perspective view of the belt engaging means of the belt tensioner of FIG. 6.

For example, such a tensioner is generally indicated by the reference numeral 22A in FIGS. 6–8 and parts thereof similar to the tensioner 22 previously described are indicated by like reference numerals followed by the reference letter "A".

As illustrated in FIGS. 6–8, the support means 36A of the tensioner 22A is provided with a plurality of openings 132 passing therethrough which are adapted to receive the tubular splines 119A of the plastic disc-like member 100A which in turn have the splined projections or guides 115A of the backup plate 107A received in the openings 117A thereof in a loose manner so that the backup plate 107A can self-align its annular pad 106A relative to the end plate 108A so as to have its surface 121A bear against the surface 108'A of the cover member or end plate 108A that is fastened to the arm 70A by the fastening member 43A in a manner similar to that which is previously set forth.

In particular, the fastening member 43A has a multi-sided projection 150 disposed in a like multi-sided opening 151 of the end plate 108A as well as disposed in a like multisided opening 152 in an end 153 of a tubular part 154 of the arm 70A of the belt engaging means 38A to spline the end plate 108A to the arm 70A. Alternately the fastening member 43A may have knurled portions 155 press fitted in an opening 156 passing through the tubular part 154 of the arm 70A. In any event, an end 157 of the member 43A is subsequently peened over against the arm 70A to complete the assembly of the parts of the tensioner 22A.

Of course, it is to be understood that there are other ways to fasten the end plate 108A to the arm 70A of the tensioner 22A, such as by welding the enlarged head 158 of the fastening member 43A to the end plate 108A and merely relying on the press fit knurled portions 155 to spline the arm 70A to the end plate 108A.

In any event, it can be seen that the end plate 108A of the tensioner 22A rotates in unison with the arm 70A while the friction pad 106A is held stationary (except for axial movement thereof by the spring means 113A) by the stationary support means 36A.

Also, it can be seen that the antifriction disc-like member 100A of the tensioner 22A has the protective member 94A for the spring 87A on one side thereof and the bearing means or tubular projections 119A on the other side thereof in the same manner as the tensioner 22.

However, the arm 70A has a cavity 39'A therein that receives the spring 39A therein so that the inner end of the spring 39A is attached to the shaft means 41A of the support means 36A and the outer end of the spring 39A is attached to the arm 70A, the cavity 39'A being closed by the disc-like member 100A.

The pivot or tubular member 154 of the arm 70A of the belt engaging means 38A is disposed in the tubular shaft means 41A of the support means 36A while the bearing sleeve 67A of the antifriction bearing plate 66A is disposed between the shaft means 41A and the pivot member 154 of the arm 70A whereby the shaft means 41A of the support means carries the arm 70A of the belt engaging means 38A and permits the arm 70A to rotate relative to the shaft means 41A.

Thus, it can be seen that the parts and operation of the tensioner 22A is similar to parts and operation of the tensioner 22 except that the end plate 108A rotates with the arm 70A while the friction pad 106A of the dampener 40A does not rotate whereby a further description of the operation of the tensioner 22A is deemed unnecessary.

It is to be understood that the various parts of the tensioners 22 and 22A of this invention can be modified for any desired purpose.

Figure 9:
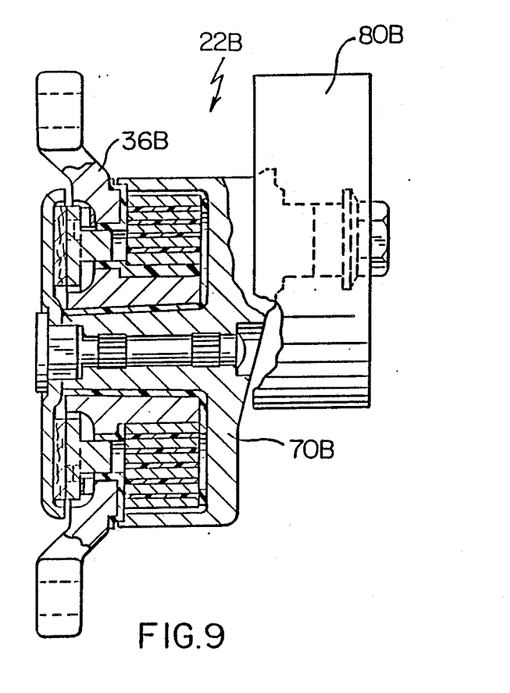
FIG. 9 is a view similar to FIG. 3 and illustrates another embodiment of the belt tensioner of this invention.

For example, see FIG. 9 where another tensioner of this invention is generally indicated by the reference numeral 22B and is substantially the same as the tensioner 22A previously described except that the support means 36B thereof has a different configuration for a particular mounting arrangement thereof and the arm 70B thereof has a different configuration so as to position the roller 80B thereof for engaging a belt that will be located in a particular location relative to the support means 36B.

Therefore, it can be seen that various modifications can be made in the various parts of this invention to provide an improved belt tensioner of this invention.

Thus, it can be seen that this invention not only provides a new belt tensioner, but also this invention provides a new method of making such a belt tensioner.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an antifriction annular disc-like member for a tensioner for a power transmission belt that is adapted to be operated in an endless path, said tensioner comprising a support means for being fixed relative to said belt, a belt engaging means carried by said support means and being movable relative thereto, first spring means operatively associated with said support means and said belt engaging means for urging said belt engaging means relative to said support means and against said belt with a force to tension said belt, and frictional dampening means operatively associated with said support means and said belt engaging means to dampen the movement of said belt engaging means relative to said support means in at least one direction of movement thereof, said dampening means having a longitudinal axis, said support means comprising a shaft means having a longitudinal axis and being fixed from movement relative to said belt engaging means, said belt engaging means having a portion thereof being rotatably carried by said shaft means so as to rotate relative to said shaft means, said dampening means comprising a pair of frictionally engaging first and second parts with said first part comprising an annular pad of friction material that is coaxially disposed and axially movable on said shaft means relative to said second part, and second spring means urging said first part against said second part with a certain spring force, said first part of said dampening means having guide means thereon, one of said support means and said belt engaging means having opening means therein that receive said guide means therein to guide axial movement of said first part, said tensioner having bearing means disposed in said opening means and receiving said guide means therein, said antifriction annular disc-like member being adapted to be disposed on said shaft means between said first spring means and said one of said support means and said belt engaging means, the improvement wherein said antifriction disc-like member carries said bearing means on one side thereof.

2. A tensioner as set forth in claim 1 wherein said disc-like member has a protective member on the other said thereof that is adapted to be disposed between said shaft means and an inner coil of said spring adjacent an inner end thereof to tend to protect said inner coil.

3. A tensioner as set forth in claim 1 wherein said bearing means comprise a plurality of sleeve-like bearings disposed in a circular array on said one side of said disc-like member.

4. In a method of making an antifriction annular disc-like member for a tensioner for a power transmission belt that is adapted to be operated in an endless path, said tensioner comprising a support means for being fixed relative to said belt, a belt engaging means carried by said support means and being movable relative thereto, first spring means operatively associated with said support means and said belt engaging means for urging said belt engaging means relative to said support means and against said belt with a force to tension said belt, and frictional dampening means operatively associated with said support means and said belt engaging means to dampen the movement of said belt engaging means relative to said support means in at least one direction of movement thereof, said dampening means having a longitudinal axis, said support means comprising a shaft means having a longitudinal axis and fixed from movement relative to said belt engaging means, said belt engaging means having a portion thereof being rotatably carried by said shaft means so as to rotate relative to said shaft means, said dampening means comprising a pair of frictionally engaging first and second parts with said first part comprising an annular pad of friction material that is coaxially disposed and axially movable on said shaft means relative to said second part, and second spring means urging said first part against said second part with a certain spring force, said first part of said dampening means having guide means thereon, one of said support means and said belt engaging means having opening means therein that receive said guide means therein to guide axial movement of said first part, said tensioner having bearing means disposed in said opening means and receiving said guide means therein, said antifriction annular disc-like member being adapted to be disposed on said shaft means between said first spring means and said one of said support means and said belt engaging means, the improvement comprising the step of forming said antifriction disc-like member to carry said bearing means on one side thereof.

5. A method as set forth in claim 4 and including the step of forming said disc-like member to have a protective member on the other side thereof that is adapted to be disposed between said shaft means and an inner coil of said spring adjacent an inner end thereof to tend to protect said inner coil.

6. A method as set forth in claim 4 and including the step of forming said bearing means to comprise a plurality of sleeve-like bearings disposed in a circular array on said one side of said disc-like member.

* * * * *